US012526634B1

(12) United States Patent
Buck et al.

(10) Patent No.: US 12,526,634 B1
(45) Date of Patent: Jan. 13, 2026

(54) AUTOMATICALLY DETECTING SIM-BREACH EVENTS

(71) Applicant: Lookout, Inc., Boston, MA (US)

(72) Inventors: Brian James Buck, Livermore, CA (US); Christoph Hebeisen, Toronto (CA); Eugene Kolodenker, Norwood, MA (US); Usman Khan, Toronto (CA); Yannick Formaggio, Squamish (CA); Tyler Croak, Columbia, MD (US)

(73) Assignee: Lookout, Inc., Boston, MA (US)

( * ) Notice: Subject to any disclaimer, the term of this patent is extended or adjusted under 35 U.S.C. 154(b) by 0 days.

(21) Appl. No.: 18/769,307

(22) Filed: Jul. 10, 2024

(51) Int. Cl.

| | |
|---|---|
| ***G06F 1/3206*** | (2019.01) |
| ***H04W 8/18*** | (2009.01) |
| ***H04W 12/122*** | (2021.01) |
| ***H04W 12/72*** | (2021.01) |
| *H04W 84/12* | (2009.01) |

(52) U.S. Cl.
CPC ......... *H04W 12/122* (2021.01); *H04W 8/183* (2013.01); *H04W 12/72* (2021.01); *H04W 84/12* (2013.01)

(58) Field of Classification Search
None
See application file for complete search history.

(56) References Cited

U.S. PATENT DOCUMENTS 8,099,472 B2 1/2012 Mahaffey et al.
10,178,223 B1 * 1/2019 Marimuthu .......... H04B 1/3816
2015/0120357 A1 * 4/2015 Tuchman ....... G06Q 10/063114 705/7.15
2016/0360504 A1 * 12/2016 Wang .................. H04B 7/2678

FOREIGN PATENT DOCUMENTS

WO WO-2018207123 A1 * 11/2018

* cited by examiner

*Primary Examiner* — Gary Lafontant
(74) *Attorney, Agent, or Firm* — Dergosits & Noah LLP; Michael E. Dergosits

(57) ABSTRACT

Methods and systems for detecting and responding to potential SIM-security breach events are described herein. A security application executing on a device may determine if the device has the ability to place calls by querying a baseband processor of the device. When the device does not have the ability to place calls, the application may then determine if an available expected mobile network is accessible (by querying the baseband processor again, in some embodiments). In response to a determination that the available expected mobile network is accessible, an interface is provided to a user asking if the user is deactivating the SIM of the device for a legitimate reason. When an input is not received confirming that the user is deactivating the SIM for a legitimate reason, the security application automatically transmits a notification that a potential SIM-security breach event has occurred.

18 Claims, 6 Drawing Sheets

101
101a
111
117
121
121
113
175
103
115
116
119
125

AUTOMATICALLY DETECTING SIM-BREACH EVENTS

TECHNICAL FIELD

The claimed subject matter relates generally to the field of mobile communications device security and more specifically to detecting and responding to potential SIM-security breach events.

BACKGROUND

Subscriber identity module (SIM) misappropriation, also known as "SIM-jacking" is an attack whereby the attacker gets the mobile carrier to redirect calls and messages to a mobile communications device that the attacker has possession of instead of the legitimate mobile communications device of the user. Using various social engineering techniques, fraudulent users may convince the mobile carrier associated with a subscriber that the subscriber's mobile communications device has been lost. Such social engineering techniques may include but are not limited to phishing, spear phishing, baiting, quid pro quo, vishing, pretexting, water-holing, tailgating, and any other techniques known in the art. Once the mobile carrier representative is convinced that the subscriber's mobile communications device has been lost, the representative typically assigns the telephone number or identifier registered to the subscriber to a new SIM controlled by the fraudulent user. This reassignment allows the fraudulent user to receive all the One-Time-Passwords (OTPs) that are utilized by Multi-factor Authentication to verify the subscriber's identity. The fraudulent user may then call the subscriber's bank to change the ID/Password associated with the subscriber's bank account, which are then used to login to the user's bank account and transfer/steal money. Since SIM-jacking does not occur on the affected mobile communications device, but instead happens in the carrier's system and has effects on the carrier's network, there are no conventional device-based solutions that address SIM-jacking.

SUMMARY

Methods and systems for detecting and responding to potential SIM-security breach events are described herein. In some embodiments, a security application executing on a computing device may be used to check the device's capability to place calls. If the security application determines that the device can place calls (audio or video calls), then no action is taken. However, if the security application determines that the device does not have the capability to place calls, the security application then proceeds to check if the expected network is available. This may be done, for example, by obtaining mobile country codes (MCC) and mobile network codes (MNC) of mobile networks accessible by the SIM (of the device). Following that, the security applications may query the baseband (e.g., a modem) to see if the network matching the MCC and MNC of the SIM is available. If the network matching the MCC and MNC of the SIM is not available, then no action is taken (as there might be a lost signal or the device may be in airplane mode). However, if network matching the MCC and MNC of the SIM is available to the computing device, and the device has no capability to place calls, it may be an indication that SIM misappropriation has occurred or is actively occurring. To determine if a SIM-security breach event is occurring, the security application may alert the user by providing a graphical interface on a display of the client device that includes a prompt capable of receiving inputs in response to the determination that the cellular connection is not accessible by the client device. The prompt may allow a user associated with the client device to indicate that they are deactivating the SIM of the computing device for a legitimate reason. When the user indicates that they have not deactivated the SIM for a legitimate reason, the security application automatically transmits a notification that a potential SIM-security breach event has occurred. The notification may include displaying on the Graphical Interface that a potential SIM-security breach event has occurred. The notification may also include flashing light of the device or vibrating the device or creating a sound alarm on the device or a combination thereof.

In other embodiments, different solutions may be used to identify and respond to potential SIM-security breach events. For example, the security application may utilize periodic messages from a security server to verify that the SIM is under control of the proper client device. Absence of communication via the periodic messages may suggest that a potential SIM-security breach event is taking place, prompting additional actions using the security application. In another example, device-to-device communications may be required between the client device and a known secure device before any SIM transfers may be performed using the client device. In such embodiments, attempted SIM transfers without the presence of the known secure device may be identified as potential SIM-security breach events.

BRIEF DESCRIPTION OF THE DRAWINGS

The embodiments are illustrated by way of example and not limitation in the figures of the accompanying drawings, in which like references indicate similar elements, and in which.

DETAILED DESCRIPTION

Figure 1:
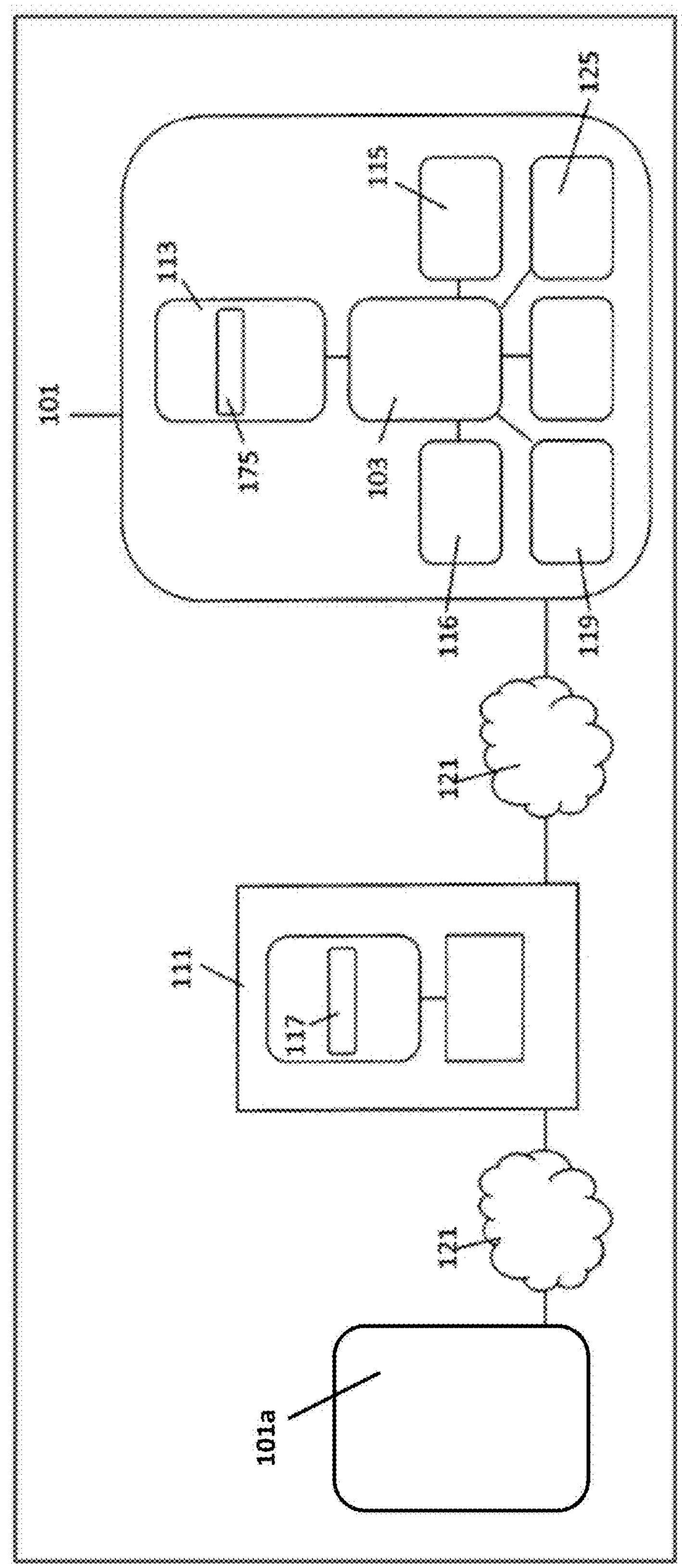
FIG. 1 illustrates a diagram of an example system for detecting and responding to potential SIM-security breach events in accordance with some embodiments.

Several different approaches and embodiments are described herein to provide a device-based solution for detecting and responding to potential SIM-security breach events. In an exemplary embodiment, a mobile security application installed on a subscriber's mobile communications device (e.g. a mobile telephone, a tablet, or a wearable computing device) may communicate with the operating system of the device, which in turn connects to the baseband processor (e.g., a modem) of the device to determine if the device has voice call capability. If the device has voice call capability, then no action is taken. However, if no voice call capability is available then the security application proceeds to determine if the expected network is available. This may be done, for example, by obtaining the MCC and the MNC of a mobile network accessible by the SIM by querying the computing device operating system (OS). The security application may then query the baseband via the OS to check if the network matching the MCC and the MNC of the SIM is available. If the network matching the MCC and the MNC of the SIM is not available then no action is taken (as there might be a lost signal or the computing device may be in Airplane mode). However, if the network matching the MCC and the MNC of the SIM is available, then it might be an indication of SIM misappropriation. The querying for allowed network types may be permitted for the security application via user-enabled security permissions within the security application. The query can be performed at regular intervals of time (e.g. every minute or every hour). When the call capability is lost and the security application has detected in previous intervals that the cellular networks are present in the user's/device's physical environment, then the security application can conclude that the SIM card no longer has entitlements for accessing that mobile network. If the user has purchased a new phone and is intentionally doing SIM swap, then the security application can present a prompt on a GUI asking if the user is deactivating the SIM for a legitimate reason (such as activating a different mobile communications device on the same plan). When the user confirms on the GUI that the SIM is being deactivated for a legitimate reason, no action is taken. However, if the user indicates via the prompt that the SIM has not been deactivated for legitimate reasons, then the security application will then conclude that a SIM swap/jack has occurred.

The present disclosure may be implemented in numerous ways including, but not limited to, as a process, an apparatus, a system, a device, a method, or a computer readable medium such as a non-transitory computer readable storage medium containing computer readable instructions or computer program code, or a computer network wherein computer readable instructions or computer program code are sent over optical or electronic communication links. Applications, software programs or computer readable instructions may be referred to as components or modules. Applications may take the form of software executing on a general purpose computer or be hardwired or hard coded in hardware. Applications may also be downloaded in whole or in part through the use of a software development kit, framework, or toolkit that enables the creation and implementation of the present disclosure. Applications may also include web applications, which include components that run on the device in a web browser. In this specification, these implementations, or any other form that the disclosure may take, may be referred to as techniques. In general, the order of the steps of disclosed methods may be altered within the scope of the disclosure, except in those instances where it is specified that the order of steps must be in a particular sequence.

As used herein, the term "mobile communications device" may refer to mobile phones, PDAs, smartphones, IoT devices, Smartwatches, Wearables, Augmented Reality devices, Virtual Reality devices, etc. The term "mobile communications device" may also refer to a class of laptop computers which run an operating system that is also used on mobile phones, PDAs, or smartphones. Such laptop computers are often designed to operate with a continuous connection to a cellular network or to the internet via a wireless link. The term "mobile communications device" excludes other laptop computers, notebook computers, or sub-notebook computers that do not run an operating system that is also used on mobile phones, PDAs, and smartphones. Specifically, mobile communications devices include devices for which wireless communications services such as voice, messaging, data, or other wireless Internet capabilities are a primary function.

As used herein, a "mobile communications device" may also be referred to as a "device," "mobile device," "mobile client," "electronic device," or "handset." However, a person having skill in the art will appreciate that while the present disclosure refers to systems and methods being used on mobile communications devices, the present disclosure may also be used on other computing platforms including, but not limited to, desktop, laptop, notebook, netbook, or server computers.

As used herein, the term "client computer" may refer to any computer, embedded device, mobile device, or other system that can be used to perform the functionality described as being performed by the client computer. Specifically, client computers include devices which can be used to display a user interface by which the functionality provided by the server can be utilized by a user. Client computers may be able to display a web page, load an application, load a widget, or perform other display functionality that allows the client computer to report information from the server to the user and to receive input from the user in order to send requests to the server.

Prior to describing in detail systems and methods for detecting and responding to potential SIM-security breach events, a system in which the disclosure may be implemented shall first be described. Those of ordinary skill in the art will appreciate that the elements illustrated in FIG. 1 may vary depending on the system implementation.

As shown in FIG. 1, the system may include mobile communications devices 101, 101*a* and server 111. An example mobile communications device 101 may include an operating system 113, an input device 115, a radio frequency transceiver(s) 116, a visual display 125, and a battery or power supply 119. Each of these components may be coupled to a central processing unit (CPU) 103. The mobile communications device operating system 113 runs on the CPU 103 and enables interaction between application programs and the mobile communications device hardware components. In some embodiments, the mobile communications device 101 receives data through an RF transceiver(s) 116 which may be able to communicate via various networks including, but not limited to, Bluetooth, local area networks such as Wi-Fi, and cellular networks such as GSM or CDMA.

In some embodiments, a local software component 175 is an application program that is downloaded to a mobile communications device and installed so that it integrates with the operating system 113. Much of the source code for the local software component 175 can be re-used between various mobile device platforms by using a cross-platform software architecture. In such a system, the majority of software functionality can be implemented in a cross-platform core module. The cross-platform core can be universal allowing it to interface with various mobile device operating systems by using a platform-specific module and a platform abstraction module that both interact with the mobile device operating system 113, which is described in U.S. Pat. No. 8,099,472, entitled "SYSTEM AND METHOD FOR A MOBILE CROSS-PLATFORM SOFTWARE SYSTEM," incorporated herein by reference. In another embodiment, the local software component 175 can be device, platform or operating system specific.

The mobile communications device 101 may access a communications network 121 that permits access to server 111. The server 111 may also be accessed by another mobile communications device 101*a* via network 121. The network 121 will normally be the Internet but can also be any other communications network. Alternatively, the mobile communications device 101 may access server 111 by a different network than the network the other mobile communications device 101*a* accesses the server 111. In some embodiments, server 111 is provided with server software 117. The server software 117 on the server 111 provides functionality to allow two-way communication between the server 111 and the mobile communications devices 101, 101*a* through the network 121. The server software 117 allows data, such as location-related information, pictures, contacts, videos, SMS messages, call history, event logs, and settings to be transferred from the mobile communications device 101 to the other mobile communications device 101*a* and vice versa.

It is understood by those of ordinary skill in the art that the functionality performed by server 111 does not necessarily have to be accomplished on a single hardware device. In this context, the use of the term server is intended to refer to one or more computers operating in cooperation or collaboration to provide the functionality described herein. The computers may be co-located or in different locations. The computers may inter-operate in such a way that portions of functionality are provided by separate services that may or may not be operated by the same entity as other computers which provide other functionality. For example, one set of servers may provide data storage functionality while another provides all other functionality. The data storage servers may be operated by a separate company than the servers that provide the other functionality. S3 (simple storage system), from Amazon, Inc. is such a data storage service which may be utilized by separate set of computers to enable the present invention.

It should be understood that the arrangement of electronic mobile communications device 101 illustrated in FIG. 1 is but one possible implementation and that other arrangements are possible. It should also be understood that the various system components defined by the claims, described below, and illustrated in the various block diagrams represent logical components that are configured to perform the functionality described herein. For example, one or more of these system components (and means) can be realized, in whole or in part, by at least some of the components illustrated in the arrangement of mobile communications device 101. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the disclosure described herein can be embodied in many different variations, and all such variations known to those of ordinary skill are contemplated to be within the scope of what is claimed.

In the description that follows, the disclosure will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the device, which reconfigures or otherwise alters the operation of the device in a manner well understood by those skilled in the art. The data structures where data is maintained are physical locations of the memory that have particular properties defined by the format of the data. However, while the disclosure is being described in the foregoing context, it is not meant to be limiting as those of skill in the art will appreciate that various of the acts and operation described hereinafter may also be implemented in hardware.

Figure 2:
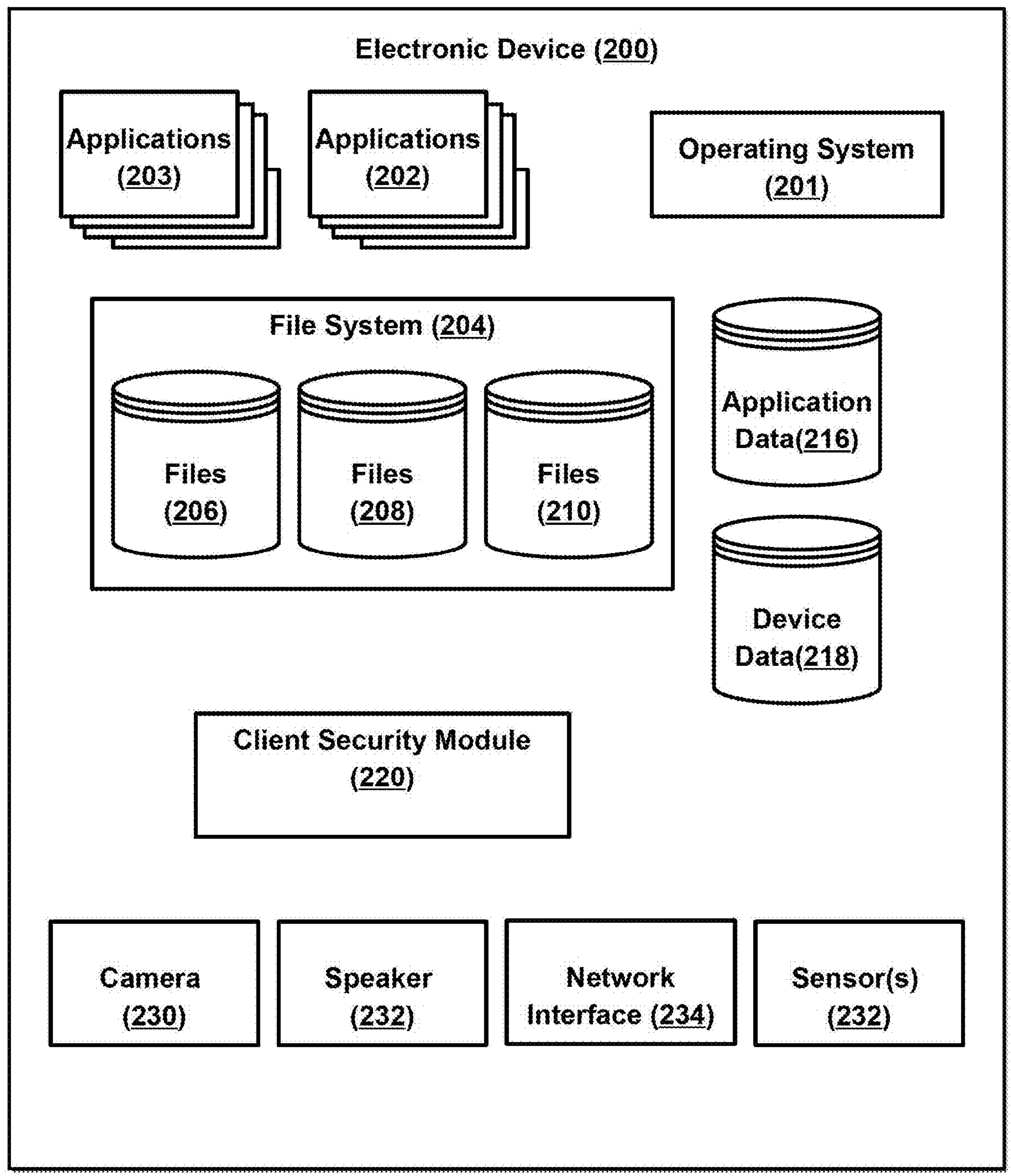
FIG. 2 illustrates a block diagram of an electronic device in accordance with some embodiments of the disclosure.

FIG. 2 illustrates a block diagram of an electronic device 200 in accordance with some embodiments of the disclosure. As shown in FIG. 2, the electronic device 200 may be configured to provide an execution environment to host at least one operating system 201, a plurality of applications 202 and 203, and a file system 204. In some embodiments, each of the plurality of applications 202 and 203 may include executable code, which when executed by a processor (e.g., CPU 103), may provide a service or function of the electronic device 200. Each of the plurality of applications 202 or 203 may be associated with at least a part of the application data 216.

In the same or alternative embodiments, one or more of the plurality of applications 202 or 203 may access any of the file system 204 comprising file sources 206, 208, and 210, application data 216, device data 218, camera 230, speaker 232, network interface 234, and sensor(s) 232. For example, the electronic device 200 may host or run a plurality of applications 202 and 203. A first application may access or retrieve data from application data 216 and file source 206 from the file system 204. A second application may access or retrieve data from the device data 218 and file sources 208 and 210 from the file system 204. Furthermore, a third application may retrieve data generated from the camera 230 and sensor(s) 232 and access the network interface 234. As such, each of the applications of the plurality of applications 202 and 203 may access various types of data or files stored on the electronic device 200 as well as a functionality (e.g., camera 230, speaker 232, network interface 234, sensor(s) 232) of the electronic device 200. In some embodiments, the electronic device 200 may also support the operation of a client security module 220 that may be responsible for creating and implementing policies for the electronic device 200. In some embodiments, the client security module 220 may operate in the electronic device 200 as a client application hosted by the electronic device 200, as is shown in FIG. 2. In an alternative embodiment, the client security module 220 may be provided by and integrated within the operating system 201 of the electronic device 200 using a root directory and/or having root privileges to the operating system 201. In either of the embodiments, the client security module 220 may be configured to manage the creating and applying of policies, including detecting and responding to potential SIM-security breach events as described herein. In another embodiment, the client security module 220 may operate on a server in communication with the electronic device 200.

Figure 3:
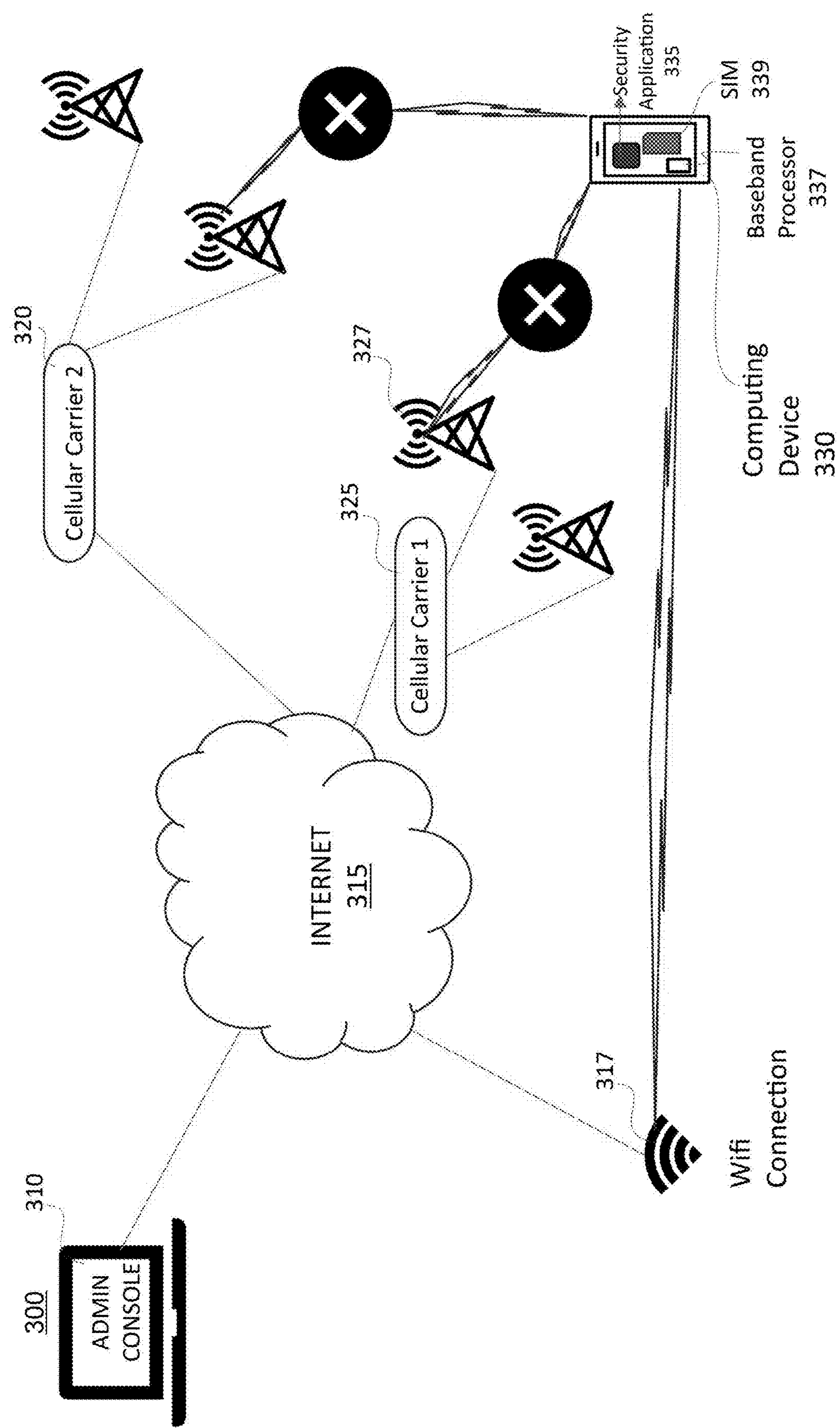
FIG. 3 illustrates a block diagram of a system for detecting and responding to potential SIM-security breach events in accordance with some embodiments.

FIG. 3 illustrates a block diagram of a system environment 300 for detecting and responding to potential SIM-security breach events in accordance with various embodiments. The exemplary system architecture 300 includes a client computing device 330 (which may be an electronic device 200) in communication with an available mobile network 325 (e.g. Cellular Carrier 1) over a cellular connection. The computing device 330 may be any device that uses a SIM 339 to communicate with an available mobile network 325, such as a mobile telephone, a tablet computing device, or a wearable computing device. The available mobile network 325 is associated with a mobile carrier network, and may provide a cellular data connection to the client device 330, in addition to communicating to administrative console 310 via Internet connection 315 in some embodiments. Second mobile network 320 may also be available to the computing device 330. While the computing device 330 may be able to detect and potentially utilize a plurality of available mobile networks, including the second available mobile network 320, in general only one mobile network is utilized for cellular data connections. This is due to the fact that to use cellular data, a user is conventionally required to have a carrier account registered with the mobile carrier associated with a specific mobile network (however, users may have access to multiple mobile networks, for example, using prepaid accounts and the like).

The security application 335 installed on the computing device 330 may communicate with the computing device 330 operating system (OS) to see if the computing device 330 has the ability to place calls using an available mobile network 325. The OS of the computing device 330 communicates with the network interface of the computing device 330, such as a baseband processor 337 (or a modem, or any other device that comprises a communications transceiver) to check for voice call capability. The baseband processor 337 may include hardware and software designed to receive and process signals of a predetermined frequency sent by the cell tower 327, for example. The communications with the device OS may be done using application programming interfaces (APIs, such as Android public APIs or private APIs), and may take the form of periodic queries of the device OS by the security application, or receiving notifications periodically from the device OS, or listening for events from the device OS (e.g. loss of voice call capability, or loss of a mobile network connection), or any combination thereof. If the security application 335 determines that the computing device 330 has capability to place calls then no action is taken. However, if the baseband processor 337 indicates to the device OS that there is no voice call capability, the security application 325 proceeds to determine if an expected mobile network 325 is available. This may be done, for example by obtaining the mobile country codes (MCC) and mobile network codes (MNC) of the mobile networks accessible using the SIM 339 by querying the device OS via API. In response to receiving the MCCs and MNCs of the mobile networks accessible using the SIM 339, the security application 335 may then use APIs to query the baseband processor via the device OS to determine if a mobile network 325 matching the MCC and MNC of the SIM 339 is available to the computing device 330. If the security application 335 receives confirmation that the mobile network matching the MCC and MNC of the SIM is not available, no action is taken, as the security application 335 may reasonably conclude that there is a lost signal or the computing device is in airplane mode. When the baseband processor indicates that the network matching the MCC and MNC of the SIM 339 is available to the computing device despite there being no voice call capability, the security action takes action to respond to a potential SIM misappropriation. For example, the security application 335 may then display a message and ask the user if there is a legitimate reason to deactivate the SIM. Examples of legitimate reasons include if the user is moving to a new device, such as user is replacing a defective SIM, a new version of a SIM being required, the user is switching cell phone plans (e.g. switching mobile carriers from one provider to a different provider), the user is moving to a second client device (e.g., a new mobile telephone using the same SIM as the client device), etc. If the user says no via a displayed prompt, there is a significant likelihood that SIM misappropriation is taking place. If the device 330 is connected to wireless network 317, the security application 335 can also send a message to administrator console 310 that a potential SIM misappropriation event is taking place.

Figure 4:
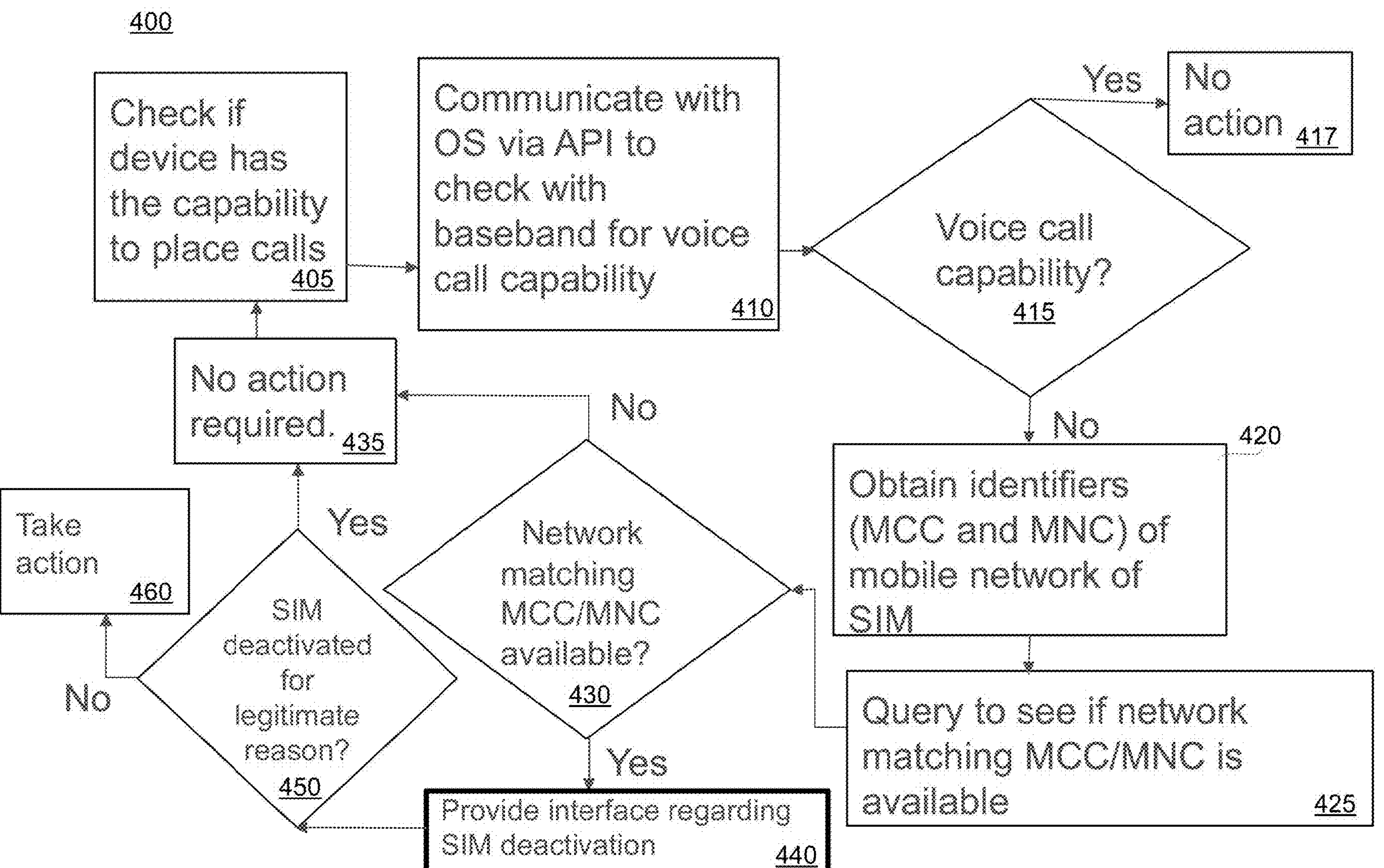
FIG. 4 illustrates a flow diagram of an example method of detecting and responding to potential SIM-security breach events using a security application in communication with at least one available mobile network in accordance with some embodiments.

FIG. 4 illustrates a flow diagram 400 of an example method of detecting and responding to potential SIM-security breach events using a security application in communication with at least one available mobile network in accordance with some embodiments. As part of determining if the cellular connection is available, at step 405 the security application 335 may communicate with the OS of the computing device 330 (e.g., using APIs) and query if the computing device 330 has the ability to place calls. The query may be performed at predetermined time intervals in some embodiments. Alternatively, the query can be performed in response to a triggering event. The trigger can be any event that affects the availability of the mobile network, such as a sudden call drop, sudden unavailability of the mobile network, etc. In response to the query by the security application 335, at step 410 the computing device OS may communicate with a baseband processor 337 (e.g., a modem) of the computing device 330 via APIs (as described above) to determine if there is voice call capability. The baseband processor 337 may include hardware and software designed to receive and process signals of a predetermined frequency sent by the cell tower 327, for example. If the baseband processor confirms to the device OS (which may relay the confirmation to the security application 335) that there is voice call capability at block 415, no action is required until the next query or notification of the security application 335 at step 417.

However, if the baseband processor indicates to the device OS that there is no voice call capability at block 415, the security application 335 proceeds to determine if an expected mobile network 325 is available. This may be done, for example by obtaining the mobile country codes (MCC) and mobile network codes (MNC) of the mobile networks (e.g. providers 325 and 330) accessible using the SIM by querying the device OS via API at step 420. In response to receiving the MCCs and MNCs of the mobile networks accessible using the SIM 339, the security application 335 may then use APIs to query the baseband processor 337 via the device OS to determine if a mobile network matching the MCC and MNC of the SIM is available to the computing device 330 at step 425. When no voice call capability is available to the computing device 330, it is expected that none of the mobile networks 325 associated with the SIM 339 are available to the baseband processor 337.

At decision block 430, if the security application receives confirmation that none of the expected mobile networks 325 matching the MCC and MNC of the SIM are available, no action is taken at step 435, as the security application 335 may reasonably conclude that there is a lost signal or the computing device is in airplane mode. When the baseband processor 337 indicates that the at least one expected mobile network 325 matching the MCC and MNC of the SIM is available to the computing device despite there being no voice call capability (as determined at block 415), the security action takes action to respond to a potential SIM misappropriation at step 440.

For example, in response to the determination that at least one expected mobile network 325 is available, but voice calls are not accessible by the computing device, an interface may be provided to the user asking if there is a legitimate reason to deactivate the SIM on the computing device. The interface may take the form of a graphical interface provided on a display of the client device that includes a prompt capable of receiving inputs. The prompt may allow a user to indicate that there is a legitimate reason to deactivate the SIM of the computing device (e.g., replacing a defective SIM, updating the SIM, change of mobile carrier, activating a second client device, etc.). When an input indicating that there is a legitimate reason to deactivate the SIM is received at block 450, then normal operation is inferred and the monitoring of the available mobile networks is resumed at block 405.

However, when an input is not received from the graphical interface indicating that the user is deactivating the SIM for a legitimate reason at block 450, the security application automatically takes at least one of a plurality of actions in response to detecting the potential SIM-security breach event at step 460. The at least one action may be triggered on the security application either by the security application receiving an indication (via the graphical interface) that the user is not deactivating the SIM of the computing device for a legitimate reason, and/or may be triggered by a predetermined amount of time passing without the user indicating that the user is deactivating the SIM in various embodiments. In some embodiments, the security application 335 automatically transmits a notification that a potential SIM-security breach event has occurred to the mobile carrier associated with the at least one available mobile network 325 and/or a user associated with the client device (e.g., the registered owner of the device, or an administrator of an organization registered as the owner of the device). This notification may be accompanied by the security application determining, when an input is not received indicating that the user is activating a second client device at block 450, if a wireless local area network (WLAN) accessible by the client device is available, such as a Wi-Fi® connection. When a WLAN connection is available to the client device, the potential SIM-security breach event notification may be transmitted as an automatically-initiated message, a phone call (using Wi-Fi network), or a voice over internet protocol (VOIP) call to a security administrator server using the available WLAN in various embodiments. In some embodiments, when a WLAN connection is not available, the security application may provide a second graphical interface on the display instructing the user to connect to a WLAN to report a potential SIM-security breach event. Alternatively, the second graphical interface on the display may include instructions to use another client device to access a security application service portal with user credentials. The user credentials may be for the security application itself or for the service portal in communication with the security application. The security application service portal, which may be a web page or application, may be configured to generate and transmit a notification that a potential SIM-security breach event has occurred.

In additional embodiments, the security application may supplement the notification by automatically generating a digital report including details regarding the loss of ability to place calls, even though at least one available expected mobile network is available, as part of a SIM-jacking incident. The potential SIM-security breach event notification may then be supplemented by including the digital report, and both of which may be transmitted to a security administrator server via the available WLAN. In additional embodiments, the security application may identify one or more web services (e.g. OKTA, provided by Okta Inc. of San Francisco, California) that use the client device for multifactor authentication. The one or more web services may be identified using a list stored locally on the client device, or a list maintained by the security administrator server in communication with the security application via the WLAN connection. When an input is not received indicating that the user is activating a second client device at block 450, the list of web services using the client device for multifactor authentication (e.g., a dual factor authentication process involving a telephone number or email address accessible by the client device) may be retrieved, and an additional notification may be sent to each web service on the list. The additional notifications may be sent to network-based end points associated with each web service, such as the individual web sites of each web service, or a web site associated with multifactor authentication services provided to the web service by a third party. When the end points require authentication, the security application may provide an interface to receive security credentials associated with the web service. In response to receiving the security credentials, the security application may authenticate the security credentials using a password manager component executing on the client device.

When WLAN is not available, in some embodiments another device including a security application client within a close proximity of the client device may automatically be identified by the security application using a wireless personal area network (WPAN) transmitter (such as a Bluetooth® transmitter, or a UWB transmitter). When an input is not received indicating that the user is activating a second client device on the graphical interface provided by the security application, the security application may automatically transmit a notification that a potential SIM-security breach event has occurred to the identified device within the close proximity of the client device via the WPAN transmitter. The notification may then be relayed by the identified device to a security administrator server. Such embodiments allow the carrier to be notified of the potential SIM-security breach event despite the client device being unable to access cellular data or a WLAN connection.

Figure 5:
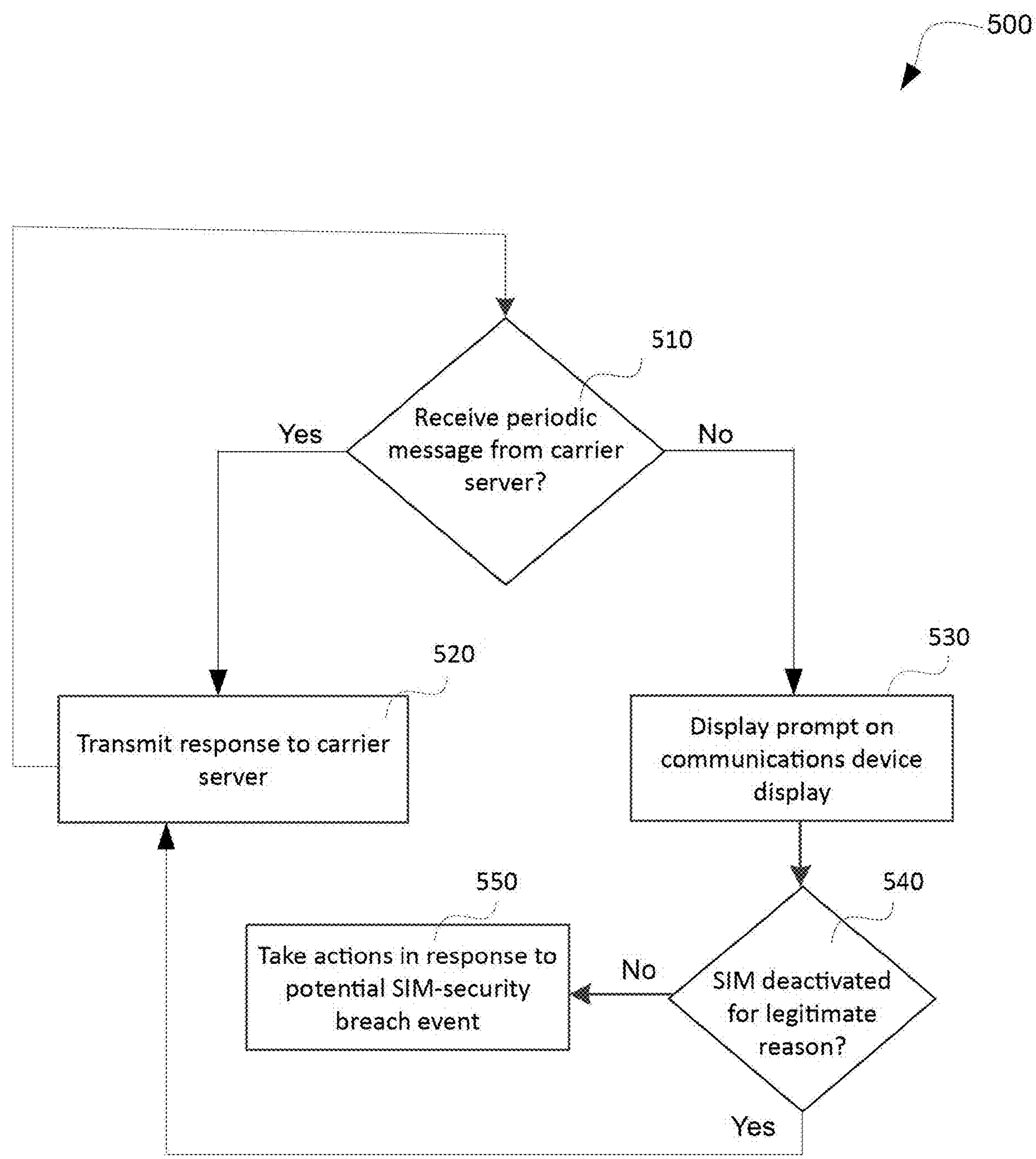
FIG. 5 illustrates a flow diagram of an example method of detecting and responding to potential SIM-security breach events using a security application using periodic messages with a security administrator in accordance with some embodiments.

While monitoring and querying mobile network and cellular data availability provides one device based SIM-security breach event protection solution, another solution may be provided using periodic messaging from a security administrator. FIG. 5 illustrates a flow diagram of an example method 500 of detecting and responding to potential SIM-security breach events using a security application using periodic messages with a security administrator in accordance with some embodiments. In the embodiment of method 500, the security application has access to incoming messages on the client device. The messages may take the form of simple message service (SMS) messages received over the cellular data connection of the client device, or may be any suitable message format that the security application may be granted permission to intercept (e.g., push notifications from a security administrator server in communication with the client device). The security administrator server may send regular messages, using SMS or the desired messaging format, to the client device, which may be received by the security application. At decision block 510, the security application checks at predetermined intervals to see if the expected periodic message has been received from the security administrator server. When the periodic message has been received within the predetermined time interval, the security application reports back to the security administrator server that it has received the periodic message at step 520. The response from the security application may be logged by the security administrator server with a record associated with the client device maintained by the security administrator server.

However, in the situation in which the client device was SIM-Jacked, the next message sent by the security administrator server goes to the client device's original account address (e.g., telephone number or email address), which is now associated with a device under the control of a fraudulent user. Accordingly, the security application at decision block 510 recognizes that the periodic message from the security administrator server has not arrived. According to some embodiments, the security application may provide, as in method 400, an interface on a display of the client device that includes a prompt capable of receiving inputs at step 530. The prompt may allow a user to indicate that they are activating or not activating a second client device. If the user provides an input at decision block 540 indicating that the SIM has been deactivated for a legitimate reason, then the security application relays that response to the security administrator server at step 520, using a WLAN connection, for example.

If there is no WLAN connection, then the security application may provide interfaces requesting one of several actions, including: (1) put the phone on a WLAN connection so that the security application can communicate with the security administrator server; or (2) have the user install the security application on the second client device and login there. Once the user has logged in, the security application on the second client device may communicate with the security administrator server and confirm that no SIM-security breach events have taken place. In some embodiments, the security administrator server may transmit a confirmation message over a preferred communications channel (e.g., SMS, push notifications, etc.) to the address associated with the client device, which is expected to be received by the security application running on the second client device. If the confirmation message is received by the second client device, then a successful SIM has occurred and monitoring for messages from the security administrator server resumes on the second client device. If the security application on the second client device does not receive the confirmation message, then technical support may be contacted at the security administrator server or the mobile carrier or both, via voice call or electronic messaging to resolve the problem. In additional embodiments, if there is no WLAN connection, the security application on the client device may display an interface that requests that the user to login to the security administrator website, authenticate using security credentials, and provide an indication to the security administrator server the user has initiated a SIM transfer. In an embodiment, the user may provide an indication in the security application on the client device, before the SIM transfer, that the user is about to switch SIMs to a second client device.

At decision block 540, if the user indicates that they are not deactivating the SIM of the computing device for a legitimate reason, or the display prompt on the communications device from step 530 times out after a predetermined time period, then the user will be prompted to take one or more of the following actions in response to a potential SIM-security breach event at step 550. First, if the client device has WLAN access, then the security application may make a VOIP call to a security administrator and/or the carrier support, and prompt the user to report a SIM-Misappropriation incident. Furthermore, the security application can send an electronic report to the security administrator and/or the carrier support that a SIM-Misappropriation incident has been reported by the user. In other embodiments, the security application may also make an electronic report to any service for which the client device SIM address was being used for MFA via SMS or voice callback that the address has been taken over. If the security application includes a password manager interface or access to a password manager application, then such reports may be authenticated prior to being transmitted to the endpoints associated with the web service.

If the client device does not have WLAN access available at step 550, the user can be directed to put the device on a WLAN network or go to a location where they can do so via an interface displayed on a display of the client device. Alternatively (or additionally), the user can be asked on a displayed interface on the client device to use any nearby device (i.e. another mobile communications device or any suitable computing device) to login to the security administrator service portal and make a report and or to call the carrier and make a report to technical support.

In some embodiments, if the user was not there or was not attending to the client device, after a predetermined time period the client device may use a WLAN connection to report the potential SIM-security breach event to the security administrator server that the expected periodic message has not arrived and the user has not responded to the prompt displayed at step 530. It is possible that the periodic message was simply dropped in transit or that the user is out of range of cell service and that no SIM-security event has happened. In this case, the security application on the client device may determine if there is cellular data connectivity. If the client device has access to cellular data, the security application can report the missing message to the security administrator server and/or the mobile carrier. Alternatively, the security application can attempt to initiate an outgoing cell call or SMS message or interrogate the network interface to determine if it still has the full cellular service available or just the emergency service. If only emergency service is available, then no report may be submitted by the security application without user intervention.

While detection of the potential SIM-security breach event is described from the security application perspective in method 500, the security administrator server may also detect potential breach events. For example, when the security administrator server transmits a periodic message and has not received the acknowledgement response from the security application on the client device, the security administrator server can take one or more of the following actions:

(1) it can resend the periodic message up to N times over a period T of time (both of which are configurable by the security administrator);
(2) it can attempt to contact the security application via a different channel, such as a network connection or push notification (e.g., when the periodic messages are sent by SMS), to determine the status;
(3) it can note whether the last known location of the client device was near a dead cell zone or was heading towards a dead cell zone;
(4) it can note whether the last reported battery level of the client device was low;
(5) it can note whether airplane mode had been turned on (this presupposes that the agent can detect a change to airplane mode and can send an indication of that change to the security administrator server before the change takes effect);
(6) depending on the configured policy for reporting SIM-Jacking, it can make a report to the mobile carrier or can wait until the policy determines that such a report should be made.
(7) The security administrator server can also forward the SIM Jack info to enterprise security admin.

Note that if the security administrator server is able to receive a notice from the device having the SIM associated with it that the periodic message had been received but that the acknowledgement response from the client device having the security application had NOT been received, the security administrator server can conclude that there has been a SIM-Jacking incident and a report to the carrier can be made.

Figure 6:
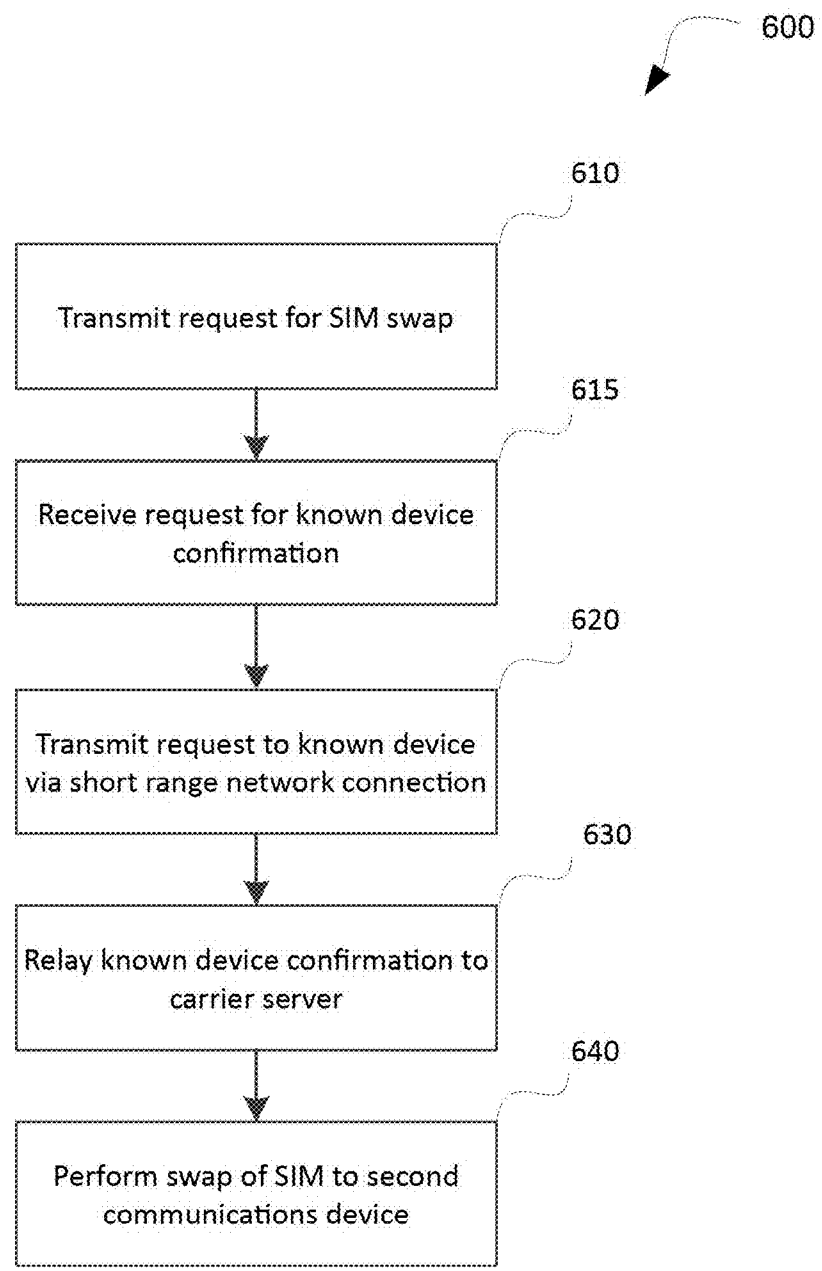
FIG. 6 illustrates a flow diagram of an example method of detecting and responding to potential SIM-security breach events based on device-to-device communications between a client device and a known secure device in accordance with some embodiments.

As noted above, many SIM-security breach events may easily be mistaken for routine SIM transfers to a second client device conventionally. FIG. 6 illustrates an example method 600 of using device-to-device communications between a client device and a known secure device to verify that a user wishes to transfer the SIM of a client device to a second client device in accordance with some embodiments. At step 610, a client device may transmit a request for a SIM swap to a carrier server in communication with the client device via a cellular data connection. In the solution of method 600, the second client device receiving the SIM is required to be within close proximity of a known second device. The known secure device also includes a security application client, and is within range of a WPAN transmission of the client device (e.g., Bluetooth® or UWB). The known secure device may be an additional device accessible by the user (e.g. an extra communications device, or the communications device of a colleague or family member on the same account with the carrier), or may be a communications device in the possession of a technician or retail employee associated with the carrier.

The carrier server may receive the request and transmit a request for the client device to provide confirmation via known secure device at step 615. Using the security applications on both the client device and the known secure device, and the WPAN transceiver of the client device, a request for confirmation may be transmitted by the client device to the known secure device. The known secure device may, in response to the request for confirmation, perform a check via WPAN to verify the second client device is in close proximity to the transferring client device. This may be done by confirming that both client devices are within WPAN range of the known secure device, for example. Once the confirmation is performed, the known secure device may transmit the confirmation to the client device, which may relay the confirmation to the carrier server at step 630. Once the carrier server receives the confirmation, permission may be received at step 640 by the client device to continue with the SIM transfer. While use of a known secure device is one way to use the security application on the client device to reduce the risk of SIM-jacking disguised as a legitimate SIM transfer, other methods may be used as well. For example, additional multifactor authentication methods may be required using the security application prior to approval of SIM transfer by the carrier server, including confirmation of a pass phrase, a bot deterrence test, and the like, via the security application on the client device.

While the embodiments have been described with regards to particular embodiments, it is recognized that additional variations may be devised without departing from the inventive concept. The terminology used herein is for the purpose of describing particular embodiments only and is not intended to be limiting of the claimed subject matter. As used herein, the term "and/or" includes any and all combinations of one or more of the associated listed items. As used herein, the singular forms "a," "an," and "the" are intended to include the plural forms as well as the singular forms, unless the context clearly indicates otherwise. It will further be understood that the terms "comprises" and/or "comprising," when used in this specification, specify the presence of states features, steps, operations, elements, and/or components, but do not preclude the present or addition of one or more other features, steps, operations, elements, components, and/or groups thereof.

Unless otherwise defined, all terms (including technical and scientific terms) used herein have the same meaning as commonly understood by one having ordinary skill in the art to which the embodiments belong. It will further be understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the embodiments, it will be understood that a number of elements, techniques, and steps are disclosed. Each of these has individual benefit and each can also be used in conjunction with one or more, or in some cases all, of the other disclosed elements, or techniques. The specification and claims should be read with the understanding that such combinations are entirely within the scope of the embodiments and the claimed subject matter.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples and are not meant to be limiting in any way. Other steps and functions may be contemplated without departing from this disclosure or the scope of an embodiment.

What is claimed is:

1. A method comprising:

determining, by a security application executing on a computing device, if the computing device has an ability to place calls, the determining being performed by querying an operating system of the computing device in communication with a baseband processor of the computing device, wherein the communication is performed via an application programming interface (API); and when the security application determines that the computing device does not have the ability to place calls:

determining, by the security application, if at least one expected mobile network is available; and in response to a determination that the at least one expected mobile network is available:

providing an interface to a user associated with the client device asking if the user is deactivating a subscriber identity module (SIM) of the computing device for a legitimate reason; and after the interface is provided to the user, when either an indication is received from the user that the user is not deactivating the SIM for a legitimate reason or the interface times out after a predetermined time period:

automatically transmitting to the user, by the security application, a notification that a potential SIM-security breach event has occurred;

determining that a wireless local area network (WLAN) accessible by the client device is available;

automatically generating a digital report including details regarding the loss of ability to place calls, even though at least one of the expected mobile network is available, as part of a SIM-jacking incident, the potential SIM-security breach event notification including the digital report and being transmitted to a security administrator server via the available WLAN; and automatically identifying, by the security application, a web service associated with a network-based end point that uses the client device as part of a dual factor authentication process, the notification also being automatically transmitted to the network-based end point.

2. The method of claim 1, wherein the determining, by the security application, if the at least one expected mobile network is available is performed by:

obtaining, by the security application, a mobile country code (MCC) and a mobile network code (MNC) of an expected mobile network via the SIM of the computing device;

querying the baseband processor to determine if the expected mobile network matching the MCC and the MNC is available; and if the expected mobile network matching the MCC and the MNC is available, determining that the device has access to at least one available expected mobile network.

3. The method of claim 1, further comprising, when an input from the user is not received indicating that the user is deactivating the SIM of the computing device for a legitimate reason, transmitting a voice over internet protocol call to a security administrator server using the available WLAN.

4. The method of claim 1, further comprising, prior to the automatically transmitting the notification:

receiving, by a user interface, security credentials associated with the web service; and authenticating, via a password manager component executing on the client device, the security credentials.

5. The method of claim 1, the client device being one of a mobile telephone, a tablet computing device, a wearable computing device, an IoT computing device or a combination thereof.

6. The method of claim 1, the automatically identifying the web service being performed using a list stored locally on the client device.

7. The method of claim 1, the automatically identifying the web service being performed using a list maintained by the security administrator server in communication with the security application via the WLAN connection, the list being retrieved from the security administrator server when an input is not received indicating that the user is activating a second client device.

8. A method comprising:

determining, by a security application executing on a computing device, if the computing device has an ability to place calls, the determining being performed by querying an operating system of the computing device in communication with a baseband processor of the computing device, wherein the communication is performed via an application programming interface (API); and when the security application determines that the computing device does not have the ability to place calls:

determining, by the security application, if the computing device has access to at least one available expected mobile network;

in response to a determination that the computing device does not have access to at least one available expected mobile network:

providing a graphical interface on a display of the computing device that includes a prompt capable of receiving inputs, the prompt allowing a user to indicate if the user is deactivating a subscriber identity module (SIM) of the computing device for a legitimate reason; and after the interface is provided to the user, when either an indication is received from the user that the user is not deactivating the SIM for a legitimate reason or the interface times out after a predetermined time period:

providing a second graphical interface on the display instructing the user to connect to a wireless local area network (WLAN) to report a potential SIM-security breach event;

detecting a connection, by the computing device, to the WLAN;

automatically generating a digital report including details regarding the loss of the at least one available mobile network as part of a potential SIM-jacking incident when an input is not received from the user indicating that the user is deactivating the SIM of the computing device for a legitimate reason;

automatically transmitting, by the security application, a potential SIM-security breach event notification including the digital report to a security administrator server using the WLAN; and automatically identifying, by the security application, a web service associated with a network-based end point that uses the client device as part of a dual factor authentication process, the notification also being automatically transmitted to the network-based end point.

9. The method of claim 8, wherein the determining, by the security application, if the computing device has access to at least one available expected mobile network is performed by:

obtaining, by the security application, a mobile country code (MCC) and a mobile network code (MNC) of an expected mobile network via the SIM of the computing device;

querying the baseband processor to determine if the expected mobile network matching the MCC and the MNC is available; and if the expected mobile network matching the MCC and the MNC is available, determining that the device does not have access to at least one available expected mobile network.

10. The method of claim 8, the second graphical interface further comprising instructions to use another computing device to access a security application service portal with user credentials, the security application service portal being configured to generate and transmit a notification that a potential SIM-security breach event has occurred.

11. The method of claim 8, further comprising:

automatically transmitting, by the security application, a voice over internet protocol call using the WLAN to a security administrator server when an input is not received from the user indicating that the user is deactivating the SIM of the computing device for a legitimate reason.

12. The method of claim 8, further comprising, prior to the automatically transmitting the notification:

receiving, by a user interface, security credentials associated with the web service; and authenticating, via a password manager component executing on the computing device, the security credentials.

13. A method comprising:

determining, by a security application executing on a computing device, if the computing device has an ability to place calls, the determining being performed by querying an operating system of the computing device in communication with a baseband processor of the computing device, wherein the communication is performed via an application programming interface (API); and when the security application determines that the computing device does not have the ability to place calls:

determining, by the security application, if the computing device has access to at least one available expected mobile network;

in response to a determination that the computing device does not have access to at least one available expected mobile network:

providing a graphical interface on a display of the computing device that includes a prompt capable of receiving inputs, the prompt allowing a user to indicate if the user is deactivating a subscriber identity module (SIM) of the computing device for a legitimate reason; and after the interface is provided to the user, when either an indication is received from the user that the user is not deactivating the SIM for a legitimate reason or the interface times out after a predetermined time period:

automatically identifying, by the security application, a device including a security application client within a close proximity of the computing device using a wireless personal area network (WPAN) transmitter;

automatically transmitting, by the security application, a notification that a potential SIM-security breach event has occurred to the identified device within the close proximity via the WPAN transmitter;

automatically generating a digital report including details regarding the loss of the at least one available mobile network as part of a potential SIM-jacking incident, the potential SIM-security breach event notification including the digital report; and automatically identifying, by the security application, a web service associated with a network-based end point that uses the client device as part of a dual factor authentication process, the notification also being automatically transmitted to the network-based end point.

14. The method of claim 13, wherein the determining, by the security application, if the computing device has access to at least one available expected mobile network is performed by:

obtaining, by the security application, a mobile country code (MCC) and a mobile network code (MNC) of an expected mobile network via a subscriber identity module (SIM) of the computing device;

querying the baseband processor to determine if the expected mobile network matching the MCC and the MNC is available; and if the expected mobile network matching the MCC and the MNC is available, determining that the device has access to at least one available expected mobile network.

15. The method of claim 13, further comprising relaying, by the security application client included in the identified device within the close proximity, the potential SIM-security breach event notification to a security administrator server.

16. The method of claim 13, the client device being one of a mobile telephone, a tablet computing device, a wearable computing device, an IoT computing device or a combination thereof.

17. A method comprising:

determining, by a security application executing on a computing device, if the computing device has an ability to place calls, the determining being performed by querying an operating system of the computing device in communication with a baseband processor of the computing device, wherein the communication is performed via an application programming interface (API); and when the security application determines that the computing device both does not have the ability to place calls:

determining, by the security application, if the computing device has access to at least one available expected mobile network;

in response to a determination that the computing device has access to at least one available expected mobile network:

determining that a wireless local area network (WLAN) accessible by the computing device is available;

providing an interface to a user associated with the computing device asking if the user is deactivating a subscriber identity module (SIM) of the computing device for a legitimate reason; and after the interface is provided to the user, when the user indicates that the user is not deactivating the SIM of the computing device for a legitimate reason either by providing an indication via the interface or after the interface times out after a predetermined time period;

automatically transmitting to the user, by the security application via the WLAN, a notification that a potential SIM-security breach event has occurred; and automatically identifying, by the security application, a web service associated with a network-based end point that uses the client device as part of a dual factor authentication process, the notification also being automatically transmitted to the network-based end point.

18. The method of claim 17, wherein the determining, by the security application, if the computing device has access to at least one available expected mobile network is performed by:

obtaining, by the security application, a mobile country code (MCC) and a mobile network code (MNC) of an expected mobile network via the SIM of the computing device;

querying the baseband processor to determine if the expected mobile network matching the MCC and the MNC is available; and if the expected mobile network matching the MCC and the MNC is available, determining that the device has access to at least one available expected mobile network.

* * * * *